United States Patent
Feigl et al.

(10) Patent No.: US 10,135,039 B2
(45) Date of Patent: Nov. 20, 2018

(54) BATTERY CELL COMPRISING A COVERING PLATE FIXED IN A FORM-FITTING MANNER IN A HOUSING

(71) Applicant: Robert Bosch GmbH, Stuttgart (DE)

(72) Inventors: Markus Feigl, Markgroeningen (DE); Oliver Gerundt, Friolzheim (DE)

(73) Assignee: Robert Bosch GmbH, Stuttgart (DE)

( * ) Notice: Subject to any disclaimer, the term of this patent is extended or adjusted under 35 U.S.C. 154(b) by 715 days.

(21) Appl. No.: 14/430,980

(22) PCT Filed: Aug. 2, 2013

(86) PCT No.: PCT/EP2013/066270
§ 371 (c)(1),
(2) Date: Mar. 25, 2015

(87) PCT Pub. No.: WO2014/048623
PCT Pub. Date: Apr. 3, 2014

(65) Prior Publication Data
US 2015/0249234 A1   Sep. 3, 2015

(30) Foreign Application Priority Data
Sep. 26, 2012   (DE) .................. 10 2012 217 406

(51) Int. Cl.
*H01M 2/04*     (2006.01)
*H01M 2/08*     (2006.01)
(Continued)

(52) U.S. Cl.
CPC ......... *H01M 2/0473* (2013.01); *H01M 2/043* (2013.01); *H01M 2/0439* (2013.01);
(Continued)

(58) Field of Classification Search
None
See application file for complete search history.

(56) References Cited

U.S. PATENT DOCUMENTS

| 4,060,671 A | 11/1977 | VanderVelden |
| 2010/0273047 A1* | 10/2010 | Kunoike ............ H01M 2/08 429/181 |

(Continued)

FOREIGN PATENT DOCUMENTS

| CN | 1310866 A | 8/2001 |
| CN | 201413851 Y | 2/2010 |

(Continued)

OTHER PUBLICATIONS

CN-201413851-Y Original and Translation from Espacenet (Year: 2010).*

(Continued)

*Primary Examiner* — Barbara L Gilliam
*Assistant Examiner* — Nathanael T Zemui
(74) *Attorney, Agent, or Firm* — Michael Best & Friedrich LLP

(57) ABSTRACT

The invention relates to a battery cell (1), in particular a lithium ion battery cell, in which a wrapping element, two current collectors and an electrolyte are accommodated in a housing (11). The prismatically formed housing (11) comprises a container that is open towards the upper side and a cover arrangement having a cover plate (23) closing the opening (14) of said container. The cover plate (23) and a wall of the container (13) are designed in the region of the opening (14) in such a manner that the wall prevents a movement of the cover plate (23) from the opening by means of a positive connection. An elastically compressible sealing element (31) is provided between the wall and a wall surface of an outer edge (27) of the cover plate directed towards said wall, in order to seal the cover plate (23) hermetically against the container (13). On the basis of the positive connection between the cover plate (23) and the edge of the container (13) a sealing effect can hereby (Continued)

likewise increase while the inner pressure in the housing (11) increases. The invention relates to a battery cell (1), in which it can be prevented that the cover plate (23) must be welded to the container (13).

19 Claims, 4 Drawing Sheets

(51) Int. Cl.
    *H01M 10/0525*     (2010.01)
    *H01M 10/0587*     (2010.01)

(52) U.S. Cl.
    CPC ......... *H01M 2/08* (2013.01); *H01M 10/0525* (2013.01); *H01M 10/0587* (2013.01); *H01M 2220/20* (2013.01); *Y02T 10/7011* (2013.01)

(56) References Cited

U.S. PATENT DOCUMENTS

2011/0104549 A1*   5/2011   Kim ...................... H01M 2/027
                                                                              429/128
2012/0064380 A1    3/2012   Kim et al.
2013/0071719 A1*   3/2013   Chung ................ H01M 2/1061
                                                                              429/120

FOREIGN PATENT DOCUMENTS

| CN | 102280608 A | 12/2011 |
| DE | 102010026093 | 1/2012 |
| EP | 2333869 | 6/2011 |
| JP | 0773861 | 3/1995 |

OTHER PUBLICATIONS

International Search Report for Application No. PCT/EP2013/066270 dated Nov. 5, 2013 (English Translation, 3 pages).

Isacescu et al., "Studies in the field of polyethylene-V. Correlations between compressibility, crystallinity and molecular weight of high pressure natural polyethylenes," European Polymer Journal, Pergamon Press Ltd. Oxford GB; vol. 7, No. 7, Jul. 1, 1971, pp. 913-932.

* cited by examiner

BATTERY CELL COMPRISING A COVERING PLATE FIXED IN A FORM-FITTING MANNER IN A HOUSING

BACKGROUND OF THE INVENTION

The present invention relates to a battery cell, in particular a lithium-ion battery cell. The invention also relates to a motor vehicle comprising such a battery cell.

Battery cells, sometimes also referred to as rechargeable battery cells, are used for the chemical storage of energy which is made available electrically. Even nowadays battery cells are used for supplying energy to a large number of mobile devices. In the future, battery cells are intended to be used, inter alia, for supplying energy to mobile electric vehicles or hybrid vehicles, on land and also in water, and also for the stationary buffer-storage of electrical energy originating from alternative energy sources.

For this purpose, a large number of battery cells is usually combined to form battery packs. In order to in this case use a pack volume available as efficiently as possible, primarily battery cells with a prismatic, for example a right-parallelepipedal form are used for such purposes.

Owing to their possibly high energy density, thermal stability and lack of memory effect, a lithium-ion rechargeable battery technology, which is subject to intensive development at present owing to the high economic importance of future electromobility, is usually used for demanding applications such as, for example, storage solutions for motor vehicles.

There are already many different types of battery cells, in particular lithium-ion battery cells, and in addition in particular battery cells with a prismatic form.

However, battery cells usually have a complex design, in which a large number of different individual parts and a large number of material-processing methods are used for the assembly of the entire battery cell.

In particular, for example, welding methods are used in the assembly of the individual parts in order to connect, for example, a container, which is open at the top, of a battery cell housing to a covering plate of a cover arrangement sealing the container in a cohesive and therefore hermetically sealtight manner.

SUMMARY OF THE INVENTION

With the aid of embodiments of the present invention, it is possible to dispense, inter alia, with specific cohesive connection methods such as welding, for example, during assembly of a battery cell, or the use of said methods can be avoided at least at positions which are unfavorable for the battery cell. Disadvantages resulting from such connection methods can thus be prevented.

The invention proposes a battery cell, in particular a lithium-ion battery cell, which has at least one coil element, an electrolyte, two current collectors and a prismatic housing. The coil element has a wound stack comprising a first film, coated with anode material, a second film, coated with cathode material and two plastic films acting as diaphragms. Each of the current collectors is electrically conductively connected to one of the first and second films. The housing comprises a container and a cover arrangement. In this case, the container has an opening, through which the coil element and the two current collectors can be introduced into the housing during manufacture of the battery cell. The cover arrangement is designed to close off the opening of the container in a gas-tight and pressure-tight manner and has a covering plate arranged in the opening of the container. The battery cell is characterized by the fact that the covering plate and a wall of the container in the region of the opening of the container are formed in such a way that the wall, owing to a form-fitting connection, prevents a movement of the covering plate out of the opening. An elastically compressible sealing element is arranged between a peripheral surface of the covering plate, which peripheral surface is directed towards the wall of the container, and the wall of the container.

Embodiments of the battery cell according to the invention are based, inter alia, on the following concepts and findings:

In conventional battery cells, a covering plate is usually introduced into the opening of the container to be closed and then is welded at its rim to an inner surface of the container. For this purpose, a laser welding process can be used, for example. The cohesive connection forming during welding can provide hermetic sealing of the covering plate with respect to the container. Such hermetic sealing is required in order to prevent electrolyte accommodated in the container from being able to emerge out of the battery cell or damaging moisture from being able to enter the interior of the housing of the battery cell from the outside.

However, it has been observed that, during a welding process, generally so-called welding beads, also referred to as welding banks, can arise. These welding beads can protrude regionally beyond the housing of the battery cell. If a plurality of battery cells are intended to be arranged in a pack or a module, such welding beads can prevent adjacent battery cells from resting smoothly against one another with their housing. When the outer surfaces of the housings of adjacent battery cells cannot rest completely flat against one another, correct fitting of the battery cells to form a pack or cell module can be made more difficult.

In addition, it has been observed that the housing of a battery cell can be deformed by the action of heat released during a welding process. Such a deformation can in turn result in problems during fitting of battery cells to form a cell module.

Therefore, the invention proposes a battery cell having a modified housing, in which the covering plate is not cohesively connected to the container. Instead of such a cohesive connection, it is proposed that the covering plate and/or a wall of the container are shaped differently than in conventional battery cells such that there is a form-fitting connection between these two components which prevents the covering plate from being able to move out of the opening of the container. Owing to this form-fitting connection, the covering plate also finds sufficient hold on the container in the case of an increased internal pressure building up in the interior of the container, so that the internal pressure cannot result in the covering plate being pressed out of the container.

While the form-fitting connection between the covering plate and the wall can ensure a sufficient mechanical hold, in addition a sealing element is provided between the wall of the container and a peripheral surface, directed towards this wall, of the covering plate, which sealing element ensures the required hermetic sealing between these two components. This sealing element can surround the covering plate in the form of a ring at the rim of said covering plate so that hermetic sealing along an entire interface between the covering plate and the wall of the container can be ensured.

The sealing element can consist of a material which is chemically resistant to the electrolyte. For example, Viton® marketed by the company DuPont can be used for this.

Preferably, the covering plate and the wall of the container in the region of the opening are formed in such a way that an increase in pressure is exerted on the compressible sealing element owing to increasing internal pressure in the housing. This can be achieved, for example, by virtue of the fact that the internal pressure prevailing in the housing also acts on the covering plate and presses said covering plate against a region of the wall of the container, said region resting in a form-fitting manner, wherein the pressure exerted on the sealing element arranged between these two components likewise increases as the internal pressure increases. As a result, it is possible to achieve a situation in which a sealing effect of the sealing element increases further as the internal pressure in the housing increases, so that, even in the case of high internal pressures, it is reliably possible to avoid gas or liquid flowing through between the container wall and the covering plate and therefore escaping out of the housing.

In order to achieve the desired form-fitting connection, the wall of the container in the region of the opening can be formed in such a way that the opening tapers in cross section towards the outside. For this purpose, for example, side walls surrounding the opening of the container can be bent inwards in the region of the opening.

The container of the battery cell has a prismatic form, so that in each case two of the side walls of the container are oriented parallel to one another and preferably perpendicular to a base of the container. The covering plate can be introduced into the container, which is open at the top, between the side walls thereof. The covering plate in this case has an outer circumference which approximately corresponds to the inner circumference of the opening in the container, so that the covering plate easily stays in the opening in a force-fitting manner. Then, the side walls can be bent inwards in their upper region, i.e. in a region outside the covering plate arranged in front, so that the opening of the container then tapers in this region. Owing to the form-fitting connection produced in the process, it is possible to prevent the possibility of the covering plate being moved out of the opening again.

In one configuration, an outer rim of the covering plate is bent back inwards, i.e. through more than 90°, preferably more than 130°, and a sprayed-on sealing film as sealing element is arranged between the peripheral surface of the bent-back outer rim, which peripheral surface is directed towards the wall of the container, and the wall. The sealing film can be applied to the suitably preformed covering plate already before assembly of the battery cell, for example.

In an alternative configuration, the covering plate is flat, and a sealing lip is injection-molded onto an outer rim of the covering plate. Alternatively, a sealing ring can be fitted on the outer rim of the flat covering plate. The sealing lip can in this case be applied to the prefabricated covering plate already prior to the assembly of the battery cell, wherein injection-molding methods can be used, for example. Alternatively, a separate sealing ring can be produced and fitted to the covering plate prior to assembly of the battery cell. The sealing lip or the sealing ring can act as elastically compressible sealing element for sealing of the covering plate from the container wall. In this case, they can in particular be formed and arranged in such a way that a pressure exerted by the covering plate on the sealing lip or on the sealing ring is increased as the internal pressure in the housing increases and therefore a sealing effect is intensified.

It should be noted that possible features and advantages of a battery cell according to the invention are described herein with reference to different embodiments. A person skilled in the art will understand that the individual features can be combined with one another or replaced in a suitable manner in order to in this way arrive at further embodiments and possible synergy effects.

BRIEF DESCRIPTION OF THE DRAWINGS

The embodiments of the present invention will be described below with reference to the attached drawings, wherein neither the description nor the drawings should be interpreted as being restrictive to the invention.

The figures are merely schematic and are not true to scale. The same reference symbols denote the same or functionally identical features in the figures.

DETAILED DESCRIPTION

Figure 1:
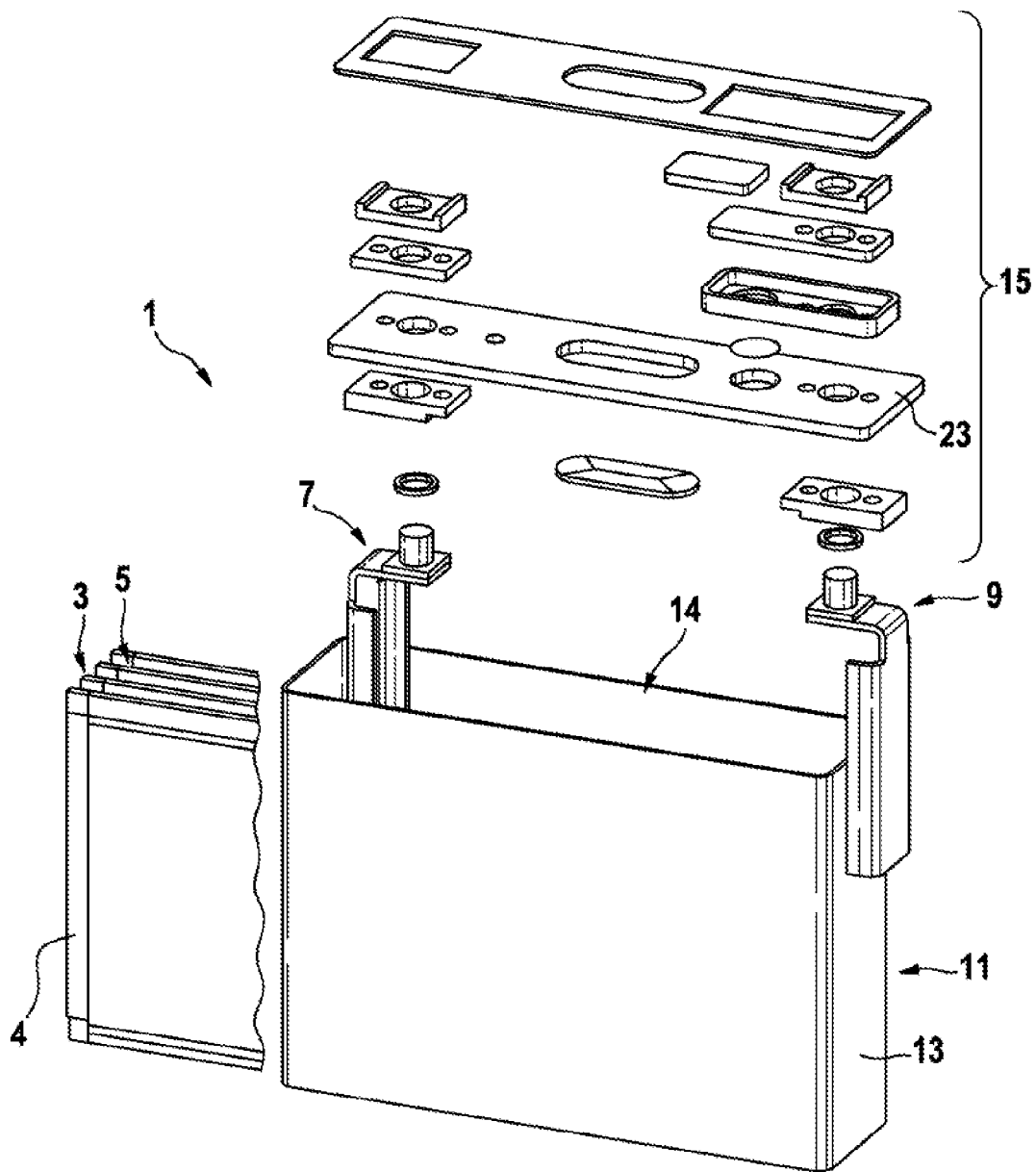
FIG. 1 shows an exploded drawing of a lithium-ion battery cell.

FIG. 1 shows a conventional lithium-ion battery cell in an exploded view. It can be seen that the battery cell comprises a large number of individual components, which are provided separately and need to be assembled, involving complexity, during manufacture. Only the component parts which are necessary for the understanding of embodiments of the invention and the features of said component parts are described herein, and there is no description of the remaining component parts of the battery cell.

The battery cell 1 has a coil element 3 comprising a wound stack 5 comprising a copper film, which is coated with anode material, and an aluminum film, which is coated with cathode material, and plastic films therebetween, which act as diaphragms.

For electrical contact-making, the copper film and the aluminum film are stacked one on top of the other with a slight offset along the coil axis in the opposite direction so that the copper film on a narrow side and the aluminum film on an opposite narrow side protrude slightly beyond a respective rim of the coil element. A copper current collector 7 is welded to a protruding region 4 of the copper film so that this current collector is electrically connected to the anode of the coil element. An aluminum second current collector 9 is welded to an opposite protruding region of the aluminum film in order to produce electrical contact with the cathode of the coil element 3.

The coil element 3 is introduced together with the two current collectors 7, 9 into a hermetically sealtight housing 11, into which the electrolyte is also introduced. The right-parallelepipedal housing 11 comprises a container 13, which is open at the top, and a cover arrangement 15, which closes the upper opening 14 of the container 13 in a sealtight manner. The cover arrangement 15 contains a covering plate 23 as main component part, said covering plate being designed in such a way that it fits into the opening 14 in the container 13 and can be welded at its rim to an inner surface of this container 13.

Further component parts of the cover arrangement 15 shown in the figure are used for other purposes such as a leadthrough of an outwardly reaching contact arrangement and safety devices for avoiding excess pressures or excess temperature in the battery cell, and will not be explained in any more detail here.

Figure 2:
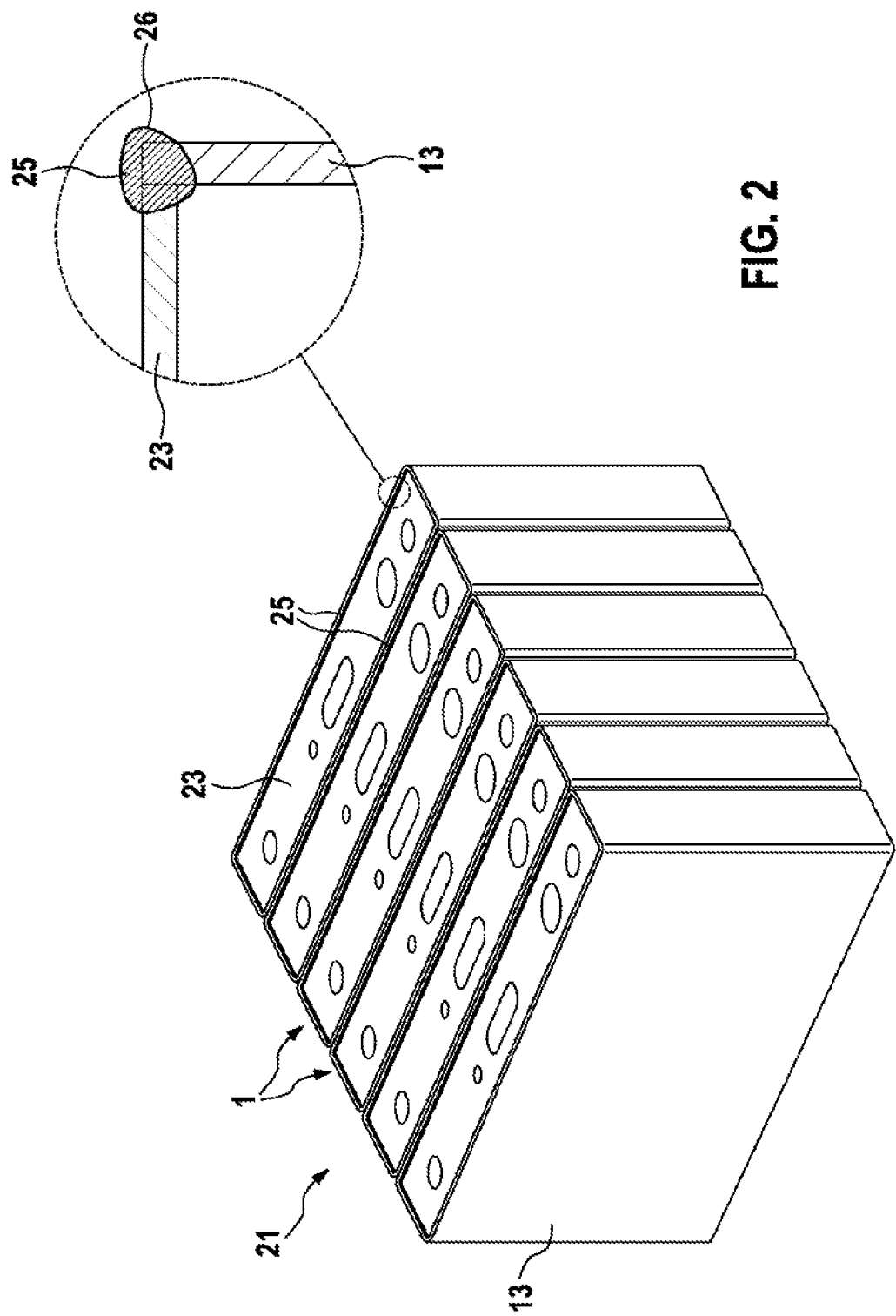
FIG. 2 shows a pack comprising a plurality of battery cells arranged next to one another.

Owing to the fact that, in conventional battery cells, the covering plate 23 is usually connected to the container 13 by means of laser welding, problems can occur during subsequent assembly of such battery cells 1 to form a cell pack 21, as is illustrated in FIG. 2. Since the formation of a weld seam 25 and, associated with this, so-called welding banks 26, which can protrude laterally beyond a lateral surface of the container 13, occurs during welding of the covering plate 23 to the container 13, during stacking of the battery cells 1 difficulties can occur to the extent that adjacent battery cells 1 no longer come to rest completely flat against one another. This can firstly result in an unused volume within the battery pack 21 and secondly result in unstable fixing of the battery cells 1 within the entire battery pack 21.

In order to be able to avoid the formation of a weld seam 25 and of welding banks 26, it is proposed that the covering plate 23 not be fixed cohesively but in a form-fitting manner in the container 13.

Figure 3:
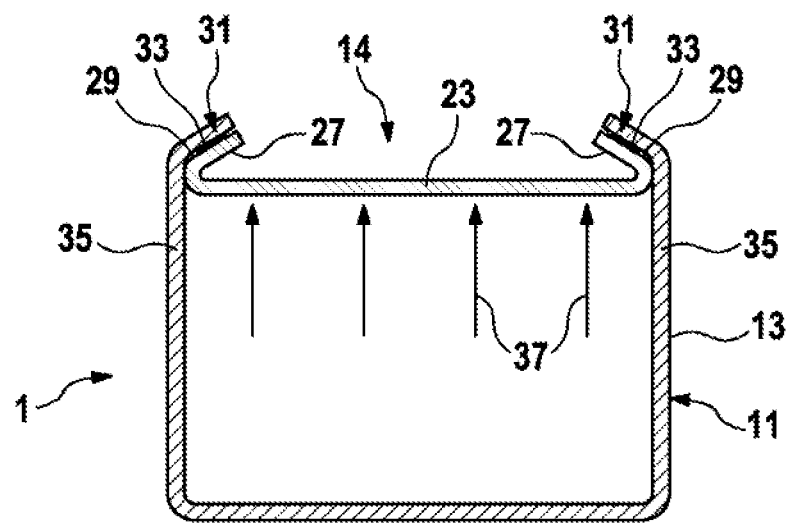
FIG. 3 shows a cross section through a housing of a battery cell in accordance with one embodiment of the present invention.

In the embodiment shown in FIG. 3, for this purpose an outer rim 27 of the covering plate 23 is bent back inwards. A sealing element 31 in the form of a sprayed-on sealing film 33 is arranged on a peripheral surface 29, which points outwards, of the outer rim 27 of the covering plate 23 which is bent back in such a way. This sealing film 33 comprises a layer which is 1 to 10 mm wide, for example, and 0.5 mm thick, for example, and which surrounds the entire covering plate 23 in the form of a ring and can be deposited on the corresponding regions of the covering plate already prior to bending-back of the outer rim, for example, by virtue of injection-molding or screenprinting methods, for example.

The covering plate 23 prepared in such a way can be introduced easily into the opening 14 in the container 13 from above. The outer dimensions of the covering plate 23 can in this case be selected such that there is a slight press fit between the covering plate 23 and the side walls 35 of the container 13 so that the covering plate 23 is held initially in a force-fitting manner in the opening 14.

Then, the side walls 35 of the container 13 can be bent inwards at their upper end so that they come to rest against the outer rim 27 of the covering plate 23, which outer rim is likewise bent inwards. The side walls 35 which are bent inwards therefore come into contact with the sealing film 33 provided there, which sealing film can therefore perform its task as sealing element 31 for the battery cell 1.

The form-fitting connection achieved by virtue of the outer ends of the side walls 35 being bent back can have the effect that the covering plate 23 exerts an increasing pressure on the sealing element 31 as the internal pressure in the housing 11 increases, as indicated by the arrow 37, so that the sealing effect of said sealing element is intensified.

Figure 4:
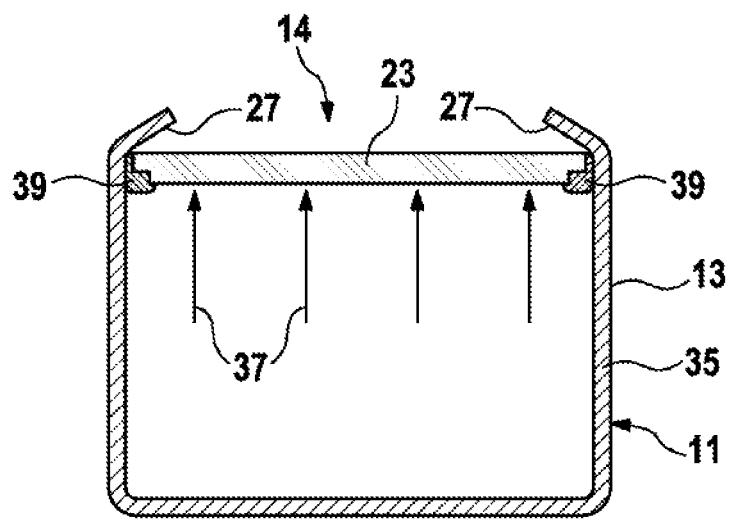
FIG. 4 shows a cross section through a housing of a battery cell in accordance with an alternative embodiment of the present invention.

In the alternative embodiment illustrated in FIG. 4, a flat covering plate 23 is used. In this case, either a sealing lip 39 can be injection-molded to an outer rim 27 of the covering plate 23 or a prefabricated sealing ring can be fitted thereon. The covering plate 23 prepared in this way can be introduced into the opening 14 in the container 13 and held there initially in a force-fitting manner. Then, the upper ends of the side walls 35 of the container 13 are again bent inwards and in this way a form-fitting connection is achieved, which prevents the covering plate 23 from being able to be pressed outwards out of the housing 14 owing to an internal pressure 37 in the housing 11.

The sealing lip 39 or the sealing ring are in this case formed and arranged in such a way that they are clamped in and compressed between the outer rim 27 of the covering plate and the inwardly bent ends of the side walls 35 of the container 13 increasingly as the internal pressure 37 increases, and thus a sealing effect is intensified.

Figure 5:
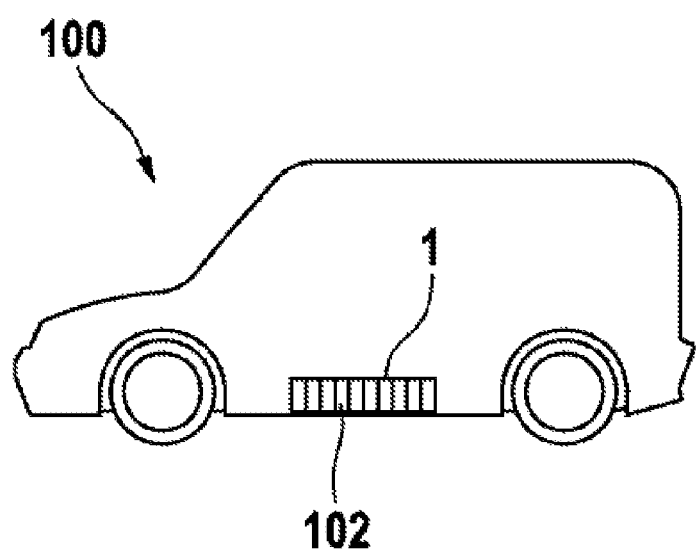
FIG. 5 shows a motor vehicle comprising a battery in accordance with an embodiment of the present invention.

FIG. 5 shows a motor vehicle 100 comprising a battery 102, which is assembled from a plurality of the above-described battery cells 1.

The invention claimed is:

1. A battery cell (1), comprising:
    a coil element (3) comprising a wound stack (5) comprising a first film, coated with anode material, a second film, coated with cathode material, and two plastic films acting as diaphragms,
    an electrolyte,
    two current collectors (7, 9), of which one is electrically conductively connected to the first film and one is electrically conductively connected to the second film,
    a prismatic housing (11) having a container (13) and a cover arrangement (15);
    wherein the container (13) has an opening (14), through which the coil element (3) and the two current collectors (7, 9) can be introduced into an interior of the housing (11) during the manufacture of the battery cell (1),
    wherein the cover arrangement (15) has a covering plate (23) arranged in the opening (14) of the container (13) such that the covering plate (23) and the container (13) are directly contacting each other via a press fit and such that the covering plate (23) closes off the opening (14) of the container (13) in a gas-tight and pressure-tight manner,
    wherein the covering plate (23) and a wall of the container (13) in a region of the opening (14) are formed in such a way that the wall, by means of a form-fitting connection, prevents a movement of the covering plate (23) out of the opening (14), and
    wherein an elastically compressible sealing element (31) is arranged between a peripheral surface of the covering plate (23), which peripheral surface is directed towards the wall, and the wall;
    wherein an outer rim (27) of the covering plate (23) is bent back inwards, wherein the container (13) includes side walls (35) which surround the opening (14), wherein the side walls (35) are bent inwards in the region of the opening (14) such that the side walls (35) overlap the outer rim (27) of the covering plate (23), and wherein the elastically compressible sealing element (31) is arranged between the outer rim (27) and the side walls (35) of the container (13).

2. The battery cell as claimed in claim 1, wherein the covering plate (23) is not cohesively connected to the container (13).

3. The battery cell as claimed in claim 1, wherein the covering plate (23) and the wall of the container (13) in the region of the opening (14) are formed in such a way that an increase in pressure is exerted on the compressible sealing element (31) owing to increasing internal pressure in the housing (11).

4. The battery cell as claimed in claim 1, wherein the wall of the container (13) in the region of the opening (14) is formed in such a way that the opening (14) tapers in cross section away from the interior.

5. The battery cell as claimed in claim 1, wherein side walls (35) of the container (13) which surround the opening (14) are bent inwards in the region of the opening (14).

6. The battery cell as claimed in claim 1, wherein an outer rim (27) of the covering plate (23) is bent back inwards and a sprayed-on sealing film (29) as a sealing element (31) is arranged between a peripheral surface of the outer rim (27), which peripheral surface is directed towards the wall, and the wall.

7. The battery cell as claimed in claim 1, wherein the covering plate (23) is flat and a sealing lip (39) is injection-molded onto an outer rim (27) of the covering plate (23).

8. The battery cell as claimed in claim 1, wherein the covering plate (23) is flat and a sealing ring is mounted on an outer rim (27) of the covering plate (23).

9. The battery cell as claimed in claim 1, wherein the sealing element (31) comprises a material which is chemically resistant to the electrolyte.

10. A motor vehicle (100) having a battery cell (1) as claimed in claim 1.

11. The motor vehicle as claimed in claim 10, wherein the covering plate (23) is not cohesively connected to the container (13).

12. The motor vehicle as claimed in claim 10, wherein the covering plate (23) and the wall of the container (13) in the region of the opening (14) are formed in such a way that an increase in pressure is exerted on the compressible sealing element (31) owing to increasing internal pressure in the housing (11).

13. The motor vehicle as claimed in claim 10, wherein the wall of the container (13) in the region of the opening (14) is formed in such a way that the opening (14) tapers in cross section away from the interior.

14. The motor vehicle as claimed in claim 10, wherein side walls (35) of the container (13) which surround the opening (14) are bent inwards in the region of the opening (14).

15. The motor vehicle as claimed in claim 10, wherein an outer rim (27) of the covering plate (23) is bent back inwards and a sprayed-on sealing film (29) as a sealing element (31) is arranged between a peripheral surface of the outer rim (27), which peripheral surface is directed towards the wall, and the wall.

16. The motor vehicle as claimed in claim 10, wherein the covering plate (23) is flat and a sealing lip (39) is injection-molded onto an outer rim (27) of the covering plate (23).

17. The motor vehicle as claimed in claim 10, wherein the covering plate (23) is flat and a sealing ring is mounted on an outer rim (27) of the covering plate (23).

18. The battery cell as claimed in claim 9, wherein, when viewed in a cross-sectional plane extending through a central axis of the container, an outer surface of the outer rim (27) extends linearly and an inner surface of the side walls (35) extends linearly and parallel to the outer surface of the outer rim.

19. A battery cell (1), comprising:
- a coil element (3) comprising a wound stack (5) comprising a first film, coated with anode material, a second film, coated with cathode material, and two plastic films acting as diaphragms,
- an electrolyte,
- two current collectors (7, 9), of which one is electrically conductively connected to the first film and one is electrically conductively connected to the second film,
- a prismatic housing (11) having a container (13) and a cover arrangement (15);
- wherein the container (13) has an opening (14), through which the coil element (3) and the two current collectors (7, 9) can be introduced into an interior of the housin4g (11) during the manufacture of the battery cell (1),
- wherein the cover arrangement (15) has a covering plate (23) that is arranged in the opening (14) of the container (13) and that closes off the opening (14) of the container (13) in a gas-tight and pressure-tight manner,19
- wherein an outer rim (27) of the covering plate (23) is bent back inwards,
- wherein the container (13) includes side walls (35) that surround the opening (14) and that are bent inwards in the region of the opening (14) such that the side walls (35) overlap the outer rim (27) of the covering plate (23),
- wherein, when viewed in a cross-sectional plane extending through a central axis of the container (13), an outer surface of the outer rim (27) extends linearly and an inner surface of the side walls (35) extends linearly and parallel to the outer surface of the outer rim (27), and
- wherein an elastically compressible sealing element (31) is arranged between the outer rim (27) and the side walls (35).

* * * * *